(12) United States Patent
Cutler et al.

(10) Patent No.: US 6,227,382 B1
(45) Date of Patent: May 8, 2001

(54) WATER FILTRATION APPARATUS

(75) Inventors: Willard A. Cutler; Kishor P. Gadkaree; Tinghong Tao, all of Big Flats, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/211,134

(22) Filed: Dec. 14, 1998

Related U.S. Application Data

(60) Provisional application No. 60/068,124, filed on Dec. 19, 1997.

(51) Int. Cl.[7] .............................. B01D 29/37; B01D 39/20
(52) U.S. Cl. ....................... 210/473; 210/483; 210/502.1; 210/506; 210/510.1
(58) Field of Search ............................... 55/523; 210/679, 210/694, 777, 282, 502.1, 506, 510.1, 348, 473, 483

(56) References Cited

U.S. PATENT DOCUMENTS

| | | | |
|---|---|---|---|
| 4,329,162 | 5/1982 | Pitcher, Jr. | 55/523 |
| 4,340,403 | 7/1982 | Higuchi et al. | 55/523 |
| 4,428,758 | 1/1984 | Montierth | 55/523 |
| 4,540,489 | 9/1985 | Barnard | 210/287 |
| 4,781,831 | 11/1988 | Goldsmith | 210/247 |
| 4,894,160 | 1/1990 | Abe et al. | 210/510.1 |
| 4,969,996 | 11/1990 | Hankammer | 210/282 |
| 5,009,781 | 4/1991 | Goldsmith | 210/247 |
| 5,114,581 | 5/1992 | Goldsmith | 210/650 |
| 5,128,036 | 7/1992 | Svensson | 210/264 |
| 5,198,007 | 3/1993 | Moyer et al. | 55/523 |
| 5,451,444 | 9/1995 | DeLiso et al. | 428/116 |
| 5,597,617 | 1/1997 | DeLiso et al. | 427/228 |
| 5,750,026 | 5/1998 | Gadkaree et al. | 210/502.1 |

FOREIGN PATENT DOCUMENTS

| | | |
|---|---|---|
| 0 745 416 | 12/1996 | (EP) . |
| 0 792 676 | 9/1997 | (EP) . |

*Primary Examiner*—Ivars Cintins
(74) *Attorney, Agent, or Firm*—Kees van der Sterre

(57) ABSTRACT

A cyst reduction water filter and a method and carafe system for using it, wherein the filter incorporates a cellular ceramic honeycomb filter element of a selectively plugged channel configuration wherein all water filtration paths traverse porous channel walls, the walls exhibiting open porosity characterized by a median pore diameter in the range of about 2–8 micrometers and with pores over 10 microns in diameter comprising not more than 10% of the open pore volume, and wherein the filter element has a primed water flux of at least 0.3 ml/min/cm$^3$ under a water pressure of 0.3 psig.

2 Claims, 4 Drawing Sheets

WATER FILTRATION APPARATUS

This application claims the benefit of U.S. Provisional Application No. 60/068,124, filed Dec. 19, 1997, entitled WATER FILTRATION METHOD AND APPARATUS, by Willard A. Cutler, Kishor P. Gadkaree and Tinghong Tao.

BACKGROUND OF THE INVENTION

The present invention relates generally to water filters and more particularly to a cyst-reduction water filter delivering a substantial water flow rate at low (gravity-assisted) water pressures. Such filters are of particular interest for applications such as gravity flow filter cartridges in water carafes.

Gravity flow filtration units continue to gain in popularity as consumers become concerned about the quality of available drinking water supplies. Carafe gravity flow units effectively address this concern because of their relatively low cost and perceived efficiency in removing unwanted tastes, odors, and harmful pollutants.

Operation of these units is simple and convenient. Water is simply poured into the top of the unit and is allowed to trickle through a replaceable filter cartridge to a treated water reservoir for later use. The filter cartridges are typically packed-bed units containing carbon pellets for the removal of adsorbable/catalyzable constituents such as chlorine and organics, and ion exchange resins for the removal of metal ions such as lead. Bacteriostatic agents such as silver may also be present. Although gaining in acceptance, filter units presently available for use in gravity flow filtration systems suffer from a number of disadvantages. Packed bed systems typically develop preferential flowpaths within the bed, resulting in less than optimal use of the available adsorbents and exchange media and correspondingly decreased purifying effectiveness and service life. They also tend to release fine adsorbent particles into the treated water during initial use.

Even more important to the consumer is the need to maintain adequate water flow rates even as designs for more efficient particle removal are developed. Gravity-assisted water flow rates through the filters are quite limited even at maximum acceptable filter cartridge sizes. Increasing the particle removal efficiency of the cartridges would likely involve more tightly packed filtration media or special membranes, both of which would be expected to further reduce gravity flow rates. Similarly, commercially available membrane filters capable of effective cyst removal do not generally provide rapid filtration. Thus, given present commercial flow rate requirements, no practical way to achieve the removal or reduction in concentration of such fine biological impurities as cyst particles (<4 micrometers in diameter) in a gravity flow filtration environment has yet been identified.

Fluid filtration elements comprising plugged honeycomb filters are well known in the art. U.S. Pat. No. 4,329,162 and published European patent application EP 0745416, for example, describe the use of such filter elements for the removal of particulates from vapor, water and other fluid streams. However, up to the present, no adaptation of such filters has been identified or considered which would offer the capability of removing very fine particulate biological contaminants such as cysts from a water stream while still offering acceptable water filtration rates under the low pressure (gravity feed) conditions found in water carafes.

SUMMARY OF THE INVENTION

The present invention comprises a water carafe incorporating a water filter element that is both effective for use as a cyst reduction filter and that provides water flow rates which, under gravity feed only, equal or exceed present commercially available filter cartridges. The filter element is a compact microporous ceramic filter body, optionally incorporating an active water treatment coating, which provides a very large effective filter area. For purposes of the present description the term "microporous" refers to pores on the order of microns in size. The large filter area is provided by the channeled honeycomb configuration of the filter, which offers high geometric surface area in a small unit. High flow rates are due largely to the relatively short water flowpath through the active filter material.

In a first aspect, then, the invention includes a cyst-reduction water filter which incorporates a cellular ceramic honeycomb filter element of a selectively plugged channel configuration. The filter element imparts cyst reduction performance, by which is meant that it can exhibit at least 99.95% removal of 3–4 $\mu$m particles when tested in accordance with NSF Standard 53, Drinking Water Treatment Units—Health Effects (September 1997).

All of the water flowpaths through the filter element traverse the porous channel walls of the honeycomb, and the walls can be relatively thin without loss of cyst-reduction characteristics. Consequently, the filter can provide a primed water flux of at least about 0.3 ml/min/cm$^3$ of filter element volume at very low inlet water pressures, i.e. water pressures typical of the water head pressures attained through gravity feed in commercial water carafes. By primed water flux is meant the water flux after the filter element has been water-primed, i.e., infiltrated with water to an extent sufficient to remove trapped air from the pore microstructure of the channel walls. Water fluxes for unprimed filter elements, or primed filter elements which have been re-exposed to air, are much lower and not indicative of the performance of the filter in use.

The honeycomb structure of the cyst-reduction filter element is typically formed of a plurality of channels separated by porous channel walls, the channels traversing the structure from a filter inlet end to a filter outlet end and including a first plurality of channels open only at the inlet end and a second plurality of channels open only at the outlet end. This selective plugging compels all raw water being filtered to traverse the channel walls of the honeycomb.

To achieve the required combination of gravity flow and efficient small particle reduction, the porous channel walls of the filter will exhibit 30–70% by volume of open porosity, with the pores being characterized by a median pore diameter in the range of about 2–8 micrometers as determined by mercury porosimetry. Further, the distribution of pore diameters about the median as determined by this method will be such that pores over 10 microns in diameter will comprise not more than about 10% of the open pore volume of the channel walls. This pore size distribution will permit the attainment of primed water flux levels of at least about 0.3 ml/min/cm$^3$ under a test water pressure of 0.3 psig which is typical of the gravity feed environment of water carafes.

In yet another aspect the invention includes a gravity-flow water carafe incorporating a cellular ceramic honeycomb water filter element of a selectively plugged channel configuration as above described. Thus the porous walls of the filter will have a median pore diameter of 2–8 microns, not more than 10% of pores over 10 microns in diameter, and a primed water flux of at least about 0.3 ml/min/cm$^3$ under a water pressure of 0.3 psig. For purposes of convenience and design flexibility, the filter element will maintain these characteristics while having an overall filter element volume not exceeding about 150 cm$^3$.

The gravity-flow water carafe of the invention will have a design such that the cellular ceramic honeycomb water filter element will remain submerged in water during repeated cycles of carafe use, regardless of whether the raw water reservoir is full or empty. This is desirable to avoid exposure of the filter element to ambient air after priming in a manner which will re-admit air into the pore structure of the filter and thereby necessitate re-priming.

In a further aspect the invention includes a method for achieving effective and rapid particle (cyst) reduction in a raw water feedstream under water pressures as low as found in gravity fed systems. By effective particle reduction is meant the removal of at least 99.95% of 3–4 micrometer (diameter) particles from a raw water feedstream comprising such particles in a concentration of up to $5 \times 10^4$ particles/ml. By rapid particle reduction is meant that treated water flux from the filter will be at a rate of at least about 0.3 ml/min/cm$^3$ under a filter inlet water pressure of 0.3 psig.

The method of the invention comprises passing the raw water through a water filter comprising a cellular ceramic honeycomb filter element having a selectively plugged channel configuration. The filter element comprises porous channel walls having specified porosity and flow characteristics. In particular, the channel walls will have a porosity characterized by a median pore diameter of 2–8 microns, with not more than 10% of the pores being over 10 microns in diameter.

It will be recognized that the relatively high porosity and channel surface area of these filters are important factors for the attainment of high water flux values under relatively low water pressures. Entirely unexpected, however, was the discovery that porosity of this character in a sintered ceramic body would permit water-borne particle removal to cyst reduction levels notwithstanding the presence of pores significantly larger in diameter than the particles being removed.

DESCRIPTION OF THE DRAWING

The invention may be further understood by reference to the drawings wherein.

DETAILED DESCRIPTION

The importance of median pore size and pore size distribution on filter element performance in accordance with the invention is reflected in the fact that many ceramic materials exhibiting median pore sizes and/or pore size distributions outside the ranges deemed operative for effective small particle filtration at acceptable gravity flow rates can be converted to efficient cyst reduction filters through treatments which modify the porosity of the channel walls. Specific examples of such treatments include vapor or liquid coating treatments which can deposit coating materials within the pore structure of the ceramic wall to reduce channel wall median pore size or pore size distribution.

Of particular interest in this connection are coating treatments which can deposit active water treating materials of controlled coating thickness within the microporous structure of the ceramic walls. A particular example of such a treatment is that used in the prior art for depositing adsorbent activated carbon coatings in the walls of plugged honeycomb filters. The carbon coatings are useful for the removal of undesirable tastes and odors and the adsorptive removal of volatile organic pollutants from contaminated vapor or liquid streams passing through the filter. Published European patent application EP0745416 discloses such treatments and coatings, and others are known.

Figure 1:
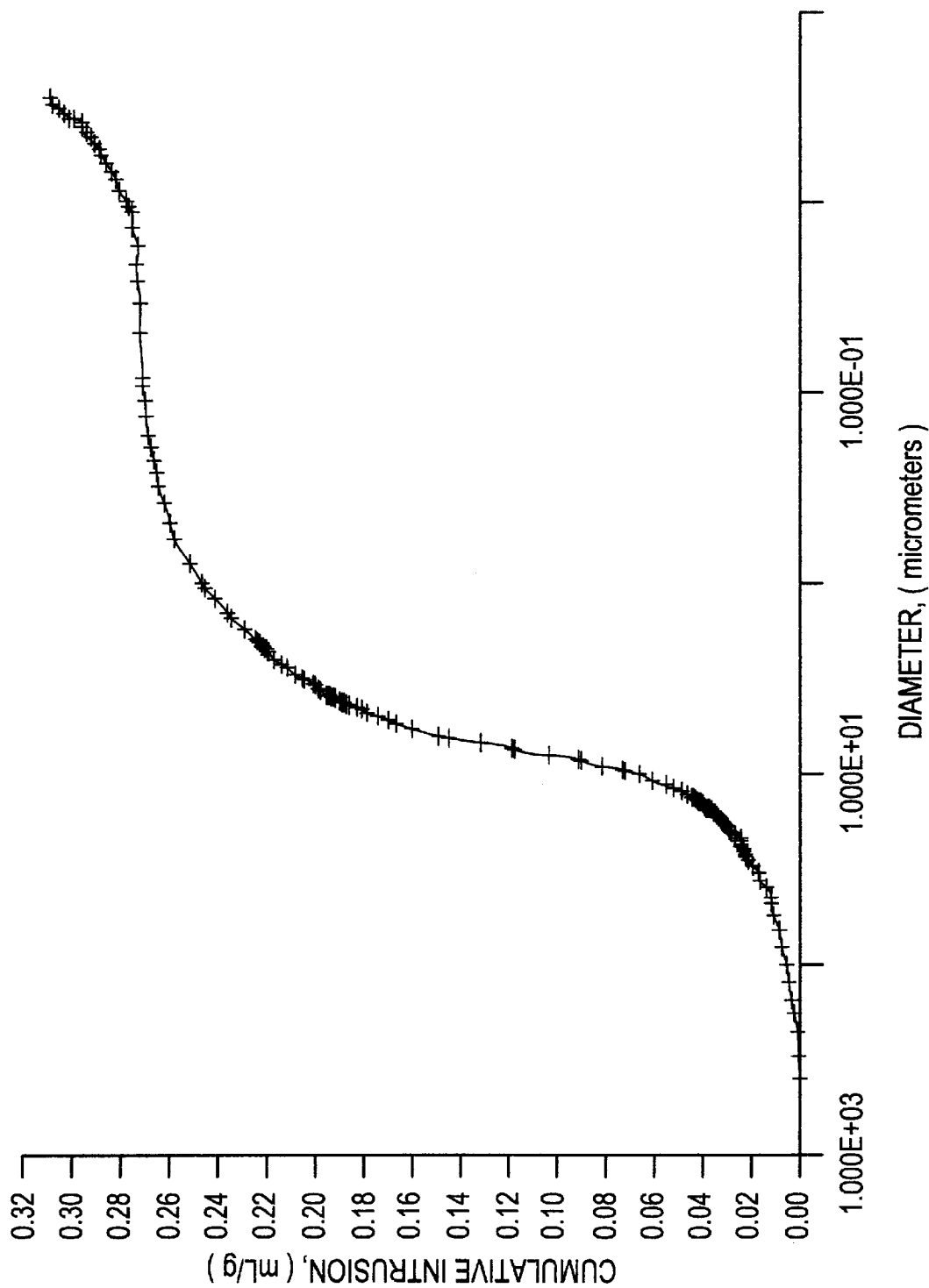
FIG. 1 is a mercury porosimetry curve for a first ceramic honeycomb filter element according to the invention.
Figure 2:
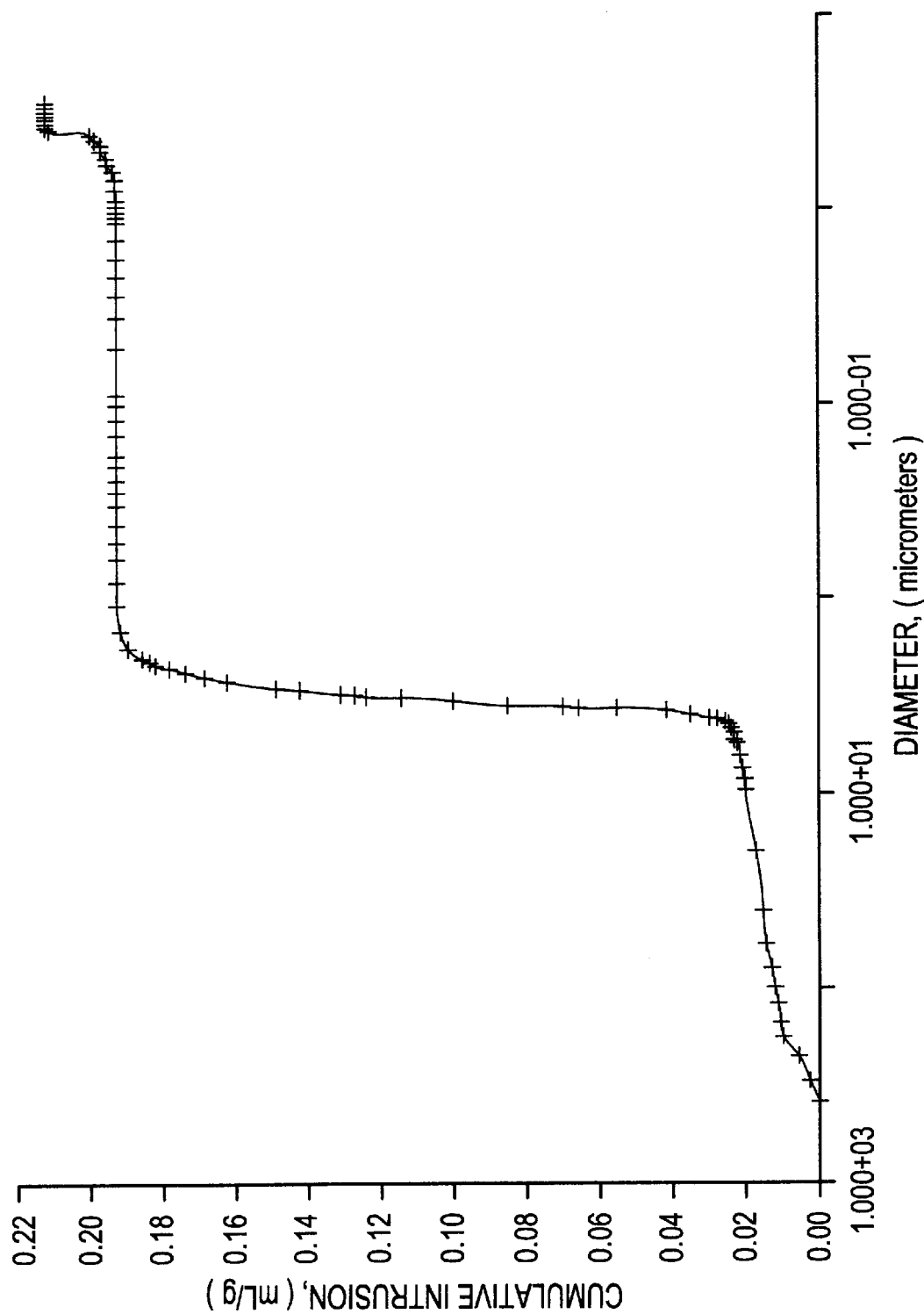
FIG. 2 is a mercury porosimetry curve for a second ceramic honeycomb filter element according to the invention.

FIGS. 1 and 2 of the drawing present mercury porosimetry curves for uncoated and coated ceramic filter elements, respectively, both being useful for cyst reduction in accordance with the invention. The uncoated filter element characterized in FIG. 1 has porosity characteristics imparting effective cyst reduction at acceptable gravity water flux levels without the need for any supplemental coatings or other treatments to modify wall porosity.

The ceramic filter element used as a starting structure for the filter element characterized in FIG. 2 had a median pore size as originally made which was above the range generally found effective for cyst reduction in accordance with the invention. The application of an activated carbon coating to the pore walls of the starting structure, however, produced a coated filter element having the porosity shown in FIG. 2. That element exhibits both effective cyst reduction and adequate water flow for use in gravity flow water filtration in accordance with the invention.

While any of the coated or uncoated ceramic filter elements employed in accordance with the invention will meet at least minimal requirements for water flux under low pressure conditions, it is desirable for carafe applications that the flow rates be as high as possible, consistent with adequate particle removal by the filter. The actual water flow rate attained for any particular filter element will of course depend not only on the gravity water flux of the porous filter element, but also on the volume of filter material available for filtration.

For purposes of the following description, low pressure (gravity) water flux and flow rates are taken to be rates determined at a representative water pressure of 0.3 psig., substantially equivalent to an 8" water head pressure, except where otherwise specifically reported. In the plugged honeycomb filters of the invention, flux is generally a linear function of water pressure drop across the filter, although the rate of increase in flux with pressure for any particular filter will depend on the geometry and porosity thereof. Thus it will be recognized that the use of the filters of the invention for cyst reduction applications is not limited to gravity flow environments; such filter elements may also be used in pressurized water filtration systems wherein much higher water fluxes can be attained.

Packed bed filters presently sold for use in gravity feed water carafes typically have physical volumes on the order of 165 cm$^3$ (10 in$^3$); this value is considered to represent a preferred upper volume limit for ceramic filter elements provided in accordance with the invention. Total gravity water flow rates through the ceramic filter element will preferably be at least 200 ml/min., in order to achieve the production of a reasonable quantity of filtered water in a reasonable time.

Maintaining physical filter volume within preferred limits while still realizing the preferred water flow rates requires that water flux values at gravity pressures be increased considerably above the minimum acceptable level. Thus gravity water flux values of at least about 1 ml/min/cm$^3$ and most preferably at least about 1.5 ml/min/cm$^3$ are preferred. While there is no upper limit to the water flux which would be desirable for a carafe application, it is doubtful that effective particle reduction and adequate water treatment can be achieved at water flux values much above about 30 ml/min/cm$^3$.

Water flux values will vary with both geometric surface area and channel wall porosity and thickness. Increasing water flux levels in plugged ceramic honeycomb filters requires increasing filter geometric surface area, increasing channel wall porosity, and/or decreasing channel wall thickness. Increasing the porosity and decreasing the thickness of the channel walls are of limited value in view of the resulting adverse effects on particle filtration. However, within the limit of preferred filter volume, a reasonable range of geometric surface area, i.e., the total geometric channel wall area of the honeycomb structure, can be covered by changing the honeycomb cell density (channels per unit of honeycomb cross-sectional area) of the ceramic filter element.

Figure 3:
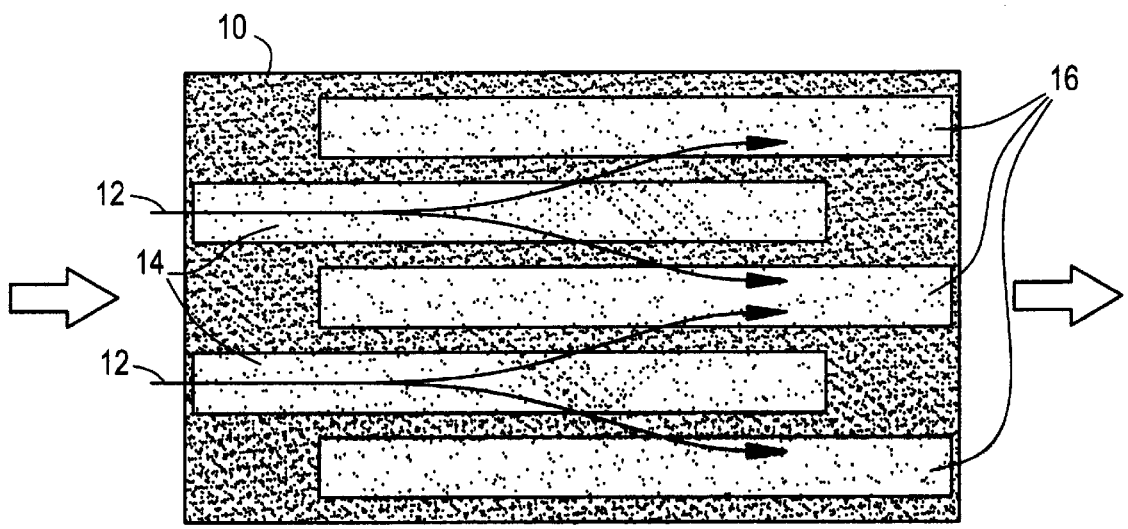
FIG. 3 is a schematic elevational cross-sectional view of a plugged ceramic honeycomb filter element provided in accordance with the invention.

FIG. 3 of the drawing provides a schematic illustration in elevational cross-section of a plugged ceramic honeycomb filter element of a type known in the art which can be specially adapted for use in the invention. As shown in FIG. 1, filter element 10 may operate to treat a stream of water flowing in the direction of large arrows 11. Small arrows 12 represent water flowpaths through the filter which traverse the channel wall separating the raw water inlet channels 14 from the treated water outlet channels 16.

Figure 4:
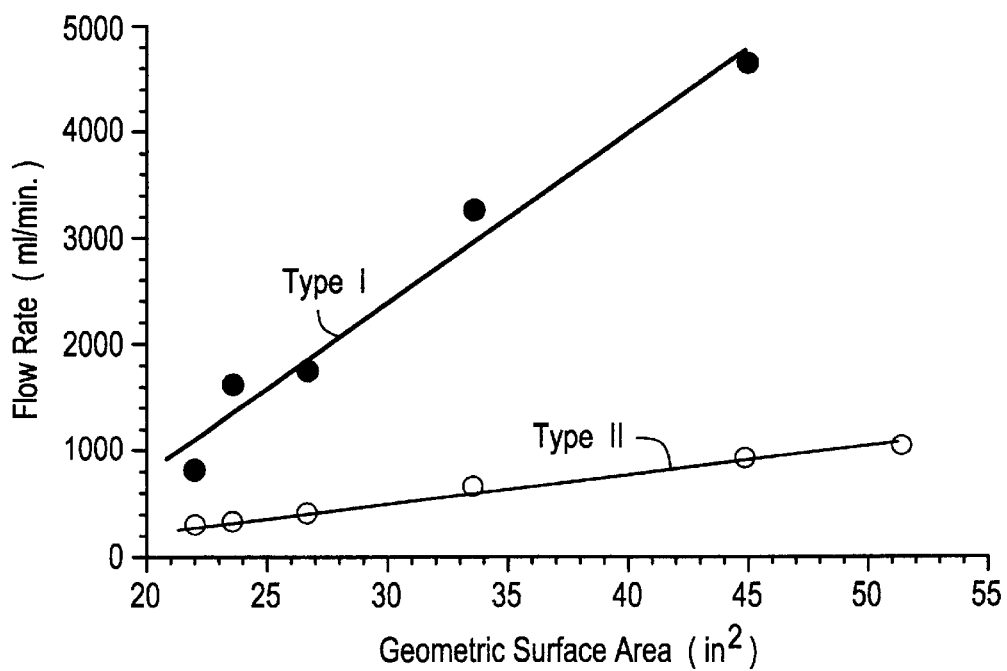
FIG. 4 plots low-pressure water flow rates through two different porous ceramic plugged honeycomb filters over a range of geometric surface areas.

The effect of filter geometric surface area on water flow rate is similar to the effect of inlet water pressure thereon. Flux and flow rate generally increase linearly with surface area at constant wall porosity, although the rate of increase varies with filter composition and design. FIG. 4 of the drawing plots water flow rate versus filter geometric surface area for two different plugged ceramic honeycomb compositions.

For purposes of FIG. 4 and the present description, the geometric surface areas reported are the aggregate surface areas of the inlet channels of the plugged honeycombs (i.e., channels 14 in FIG. 3), since this is the effective filtration surface area available for water filtration. The Type I composition shown in FIG. 4 has a wall porosity of about 57% and a median pore diameter of about 14.4 micrometers as determined by mercury porosimetry, exceeding the median diameters desired for effective cyst reduction as hereinabove described. The Type II composition has a wall porosity of about 40% and a median pore diameter of 3.4 micrometers.

The geometric surface area and resulting flow rate variations shown in FIG. 4 resulted from cell density changes ranging from about 100–400 channels/in2 of honeycomb cross-section, and from cell wall thickness changes over the range of about 0.006–0.025 inches. The flow rates shown in FIG. 4 were determined with a 5-inch water head pressure drop across the filters, and overall filter volumes were maintained at 1.5 in$^3$ throughout these tests.

While both cell density and channel wall thickness affect geometric surface area and flow rate, wall thickness has an additional and independent effect which arises from flow impedance through the wall. Typically, filter flow will decrease linearly with increases in channel wall thickness if cell density and channel wall porosity remain the same. These wall thickness effects are not as large as geometric surface area effects, however, at least in the range of wall porosities presently required.

Filter evaluations such as shown in FIG. 4 dictate a preferred range of filter geometry for ceramic filter elements to be used in gravity flow cyst reduction applications. In particular, cell densities in the range of about 200–400 channels/in$^2$ of honeycomb cross-section, and channel wall thicknesses in the range of about 0.01–0.025", will generally be preferred. The precise values of cell density and wall thickness selected will of course depend upon the porosity of the material forming the filter and the flow characteristics required in the final filter.

The composition of the ceramic material utilized to form porous filter elements in accordance with the invention is not critical, provided it resists dissolution or other deterioration upon prolonged exposure to water.

Presently preferred are reaction-sintered cordierite or mullite honeycomb bodies of the type disclosed in U.S. Pat. No. 4,329,162 to Pitcher. These can be made by sintering or reaction-sintering an extruded green honeycomb made of appropriate ceramic powders, for example, powder formulations comprised of mullite or mullite precursors such as silica and alumina, or of cordierite or cordierite precursors such as kaolin clay, talc and alumina.

As is well known, the pore size and pore size distribution of such products may be controlled through routine variations in mixture composition and firing treatment. Thus honeycombs made from other materials such as alumina, spinel or the like can be similarly molded or extruded and fired. The production of a porous ceramic honeycomb body meeting the above-disclosed porosity requirements and suitable for direct water filter use, or for water filter use after the application of an appropriate coating to the interior pore structure of the honeycomb, may therefore be accomplished using known ceramic sintering techniques.

Examples of coated and uncoated porous ceramic filter elements are disclosed in Table I below. These include a number of filters meeting the requirements of the invention, as well as several comparative filters not meeting the requirements for effective flow and particle removal. Included in Table I for each of the filters shown are an identification of ceramic composition type as well as the cell density and channel wall thickness of each of the elements. Also reported where determined on individual samples are the percent porosity and median pore size of the channel walls, water flux through the filter at an indicated water pressure, and particle removal results, if obtained.

The presence or absence of a coating on the ceramic elements reported in Table I is also indicated; where present such coatings are activated carbon coatings. The activated carbon coatings are applied by substantially infiltrating the pore structure of the ceramic with a phenolic resole resin solution of about 100 centipoises viscosity, followed by sequential heat treatments to carbonize the resin coating and activate the resulting carbon coating. This process may be repeated if desired until a carbon coating of a selected thickness is built up within the pores.

Honeycomb geometries in Table I are given in the format D/t, D being cell density reported in channels per square inch and t being channel wall thickness in thousandths of an inch. Water fluxes are given in the format Water Flux @ Head, i.e., the water flux in ml/min/cm$^3$ of filter volume at a specified water Head height in inches. The flux values are based on honeycomb physical volume, independent of cell density and surface area variations.

All of the ceramic honeycomb types are extruded, sintered honeycombs. Examples 1, 6 and 7 are reaction-sintered honeycombs formed from a mixture of kaolin clay, talc and alumina. The remaining examples are formed of pre-reacted or reaction sintered bodies formed of mullite or mullite and alumina. The principle difference among the types resides in differences in median pore diameters and pore size distributions in the porous wall of the honeycombs as initially made.

TABLE I

Honeycomb Filter Elements

| Sample No. | Ceramic Type | Honeycomb Geometry (D/t) | Porosity (%) | Median Pore Diam. (um) | Water Flux @ Head Height (ml/min./cm$^3$) | Particle Removal (%) |
|---|---|---|---|---|---|---|
| Comparative filters | | | | | | |
| 1 | A | 200/12 | 57 | 14.4 | 45.8 @ 6" | <99% (e) |
| 2 | B | 300/16 | 46 | 8.3 | 71.9 @ 6" | <99% (e) |
| 3 | C | 300/16 | 60 | 11.2 | 130.6 @ 6" | <99% (e) |
| 4 | D | 300/16 | 64 | 6.2 | 93.5 @ 6" | <99% (e) |
| Inventive Cyst Reduction Filters | | | | | | |
| 5 | E | 200/12 | 40 | 3.4 | 18.3 @ 6" | 99.95% |
| 6 | A (c) | 200/28 | 41 | 5.8 | 5.8 @ 14" | 99.99 |
| 7 | A (c) | 200/12 | | | 7.8 @ 6" | 99.97 |
| 8 | B (c) | 300/16 | | | 2.5 @ 6" | 99.95 |
| 9 | C (c) | 300/16 | | | 5.2 @ 4.5" | 99.96 |
| 10 | D (c) | 300/16 | | | 3.8 @ 6" | 99.96 |

(c) = activated carbon pore coating
(e) = estimated particle removal rate

As previously noted, particle removal by filters must be 99.95% or better under National Sanitation Foundation (NSF) International Standard 53 in order that the filter may be certified for cyst reduction use. NSF International (Ann Arbor, Mich.) is an independent ANSI certified organization which has defined the present industry standard test for certifying cyst reduction performance for drinking water units.

Testing according to NSF Standard 53 (September 1997) involves determining the level of reduction of 3- to 4-micrometer particles from a raw (challenge) water influent stream containing at least $5 \times 10^4$ particles per milliliter by at least 99.95%. The particles may be fine test dust, latex beads, or live cysts, and are added to the challenge water to achieve $\geq 50,000$ ($5 \times 10^4$) particles/mL of 3- to 4-micrometers.

Water carafe filters are tested under that portion of Standard 53 covering batch treatment systems. This involves repeatedly filling the raw water reservoir of the carafe with challenge water over an extended test period, taking influent and effluent samples for characterization at specified intervals. Performance is measured when the filter is new, and when its water flow rate has decreased to 75%, 50% and 25% of the new flow rate.

As reflected in Table I, conventional plugged ceramic honeycomb filters do not generally meet cyst reduction requirements under this test. What is required, as reflected in the data for Sample 6 in Table I and in FIG. 1 of the drawing plotting the mercury porosimetry curve for Sample 6, is a porous channel wall having a median pore size and pore size distribution sufficiently fine to insure effective particulate removal while still permitting adequate flow for gravity feed filtration use. The data for Sample 7 in Table I, and in FIG. 2 of the drawing which is a mercury porosimetry curve for that Sample, further shows that filters not initially providing porosity effective for the purpose may be converted to effective filters through appropriate treatment, e.g., internal coating, to provide such porosity. Again, however, a channel wall porosity effective for particulate removal but sufficiently open to insure adequate gravity water flow, is necessary.

Figure 5:
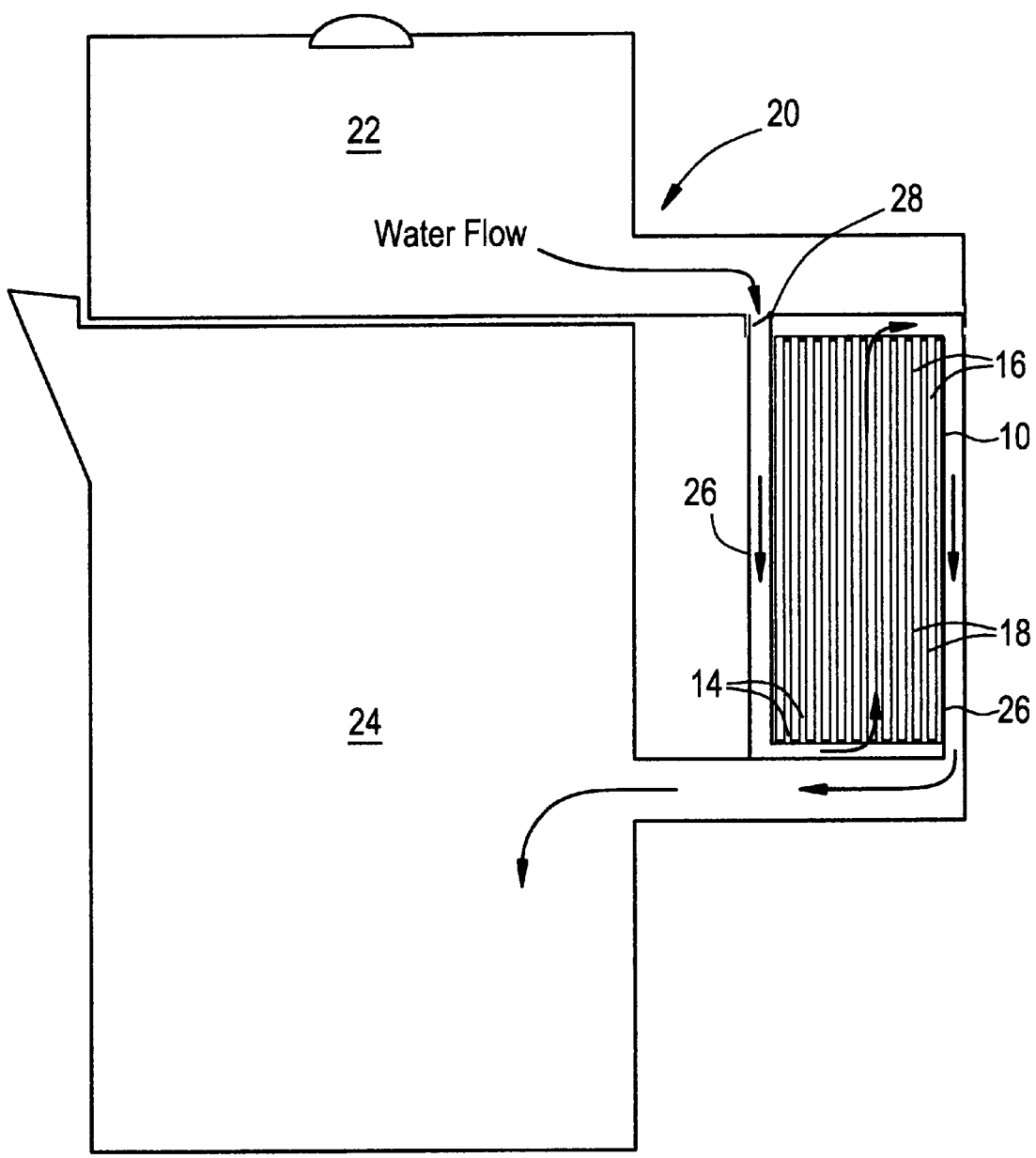
FIG. 5 is a schematic illustration of a water carafe employing a honeycomb filter element in accordance with the invention.

One illustrative example of a design for a water carafe incorporating a filter element offering both fast flow and efficient particle removal in accordance with the invention is presented schematically in FIG. 5 of the drawing. The design of FIG. 5 is for a gravity-flow water carafe 20 comprising a raw water reservoir 22, a treated water reservoir 24 and a filter reservoir 26 through which water from the raw water reservoir passes before emptying into the treated water reservoir.

In the carafe design of FIG. 5, the filter reservoir contains a water filter which is a cyst reduction filter element 10 in the form of a cellular ceramic honeycomb body of a selectively plugged channel configuration. That filter body incorporates a first plurality of raw water inlet channels 14, a second plurality of treated water outlet channels 16, and an interconnecting network of porous channel walls 18 separating the inlet channels from the outlet channels.

For the purpose of maintaining water contact with channel walls 18 of the filter element, filter reservoir 26 and its water inlet check valve 28 are adapted to retain within reservoir 26 a quantity of raw water sufficient to fill inlet channels 14 and a quantity of treated water sufficient to fill outlet channels 16 of filter element 10, even when both the raw water reservoir and the treated water reservoir are empty. This design prevents air access to channel wall 18 which, if permitted, might require the re-priming of filter element 10 in order to re-establish the fast gravity flow characteristics thereof.

We claim:

1. A gravity-flow water carafe comprising a raw water reservoir, a treated water reservoir, and a filter reservoir disposed between the raw water reservoir and the treated water reservoir through which water from the raw water reservoir passes before emptying into the treated water reservoir, wherein:

the filter reservoir contains a ceramic cyst reduction water filter element having a honeycomb structure comprising a plurality of channels separated by porous channel walls;

the channels traverse the honeycomb structure from a filter inlet end to a filter outlet end and include a first plurality of channels open only at the inlet end and a second plurality of channels open only at the outlet end;

the porous channel walls exhibit open porosity characterized by a median pore diameter in the range of about 2–8 micrometers wherein pores over 10 microns in diameter comprise not more than 10% of the open pore volume; and the filter element has a primed water flux of at least 0.3 ml/min/cm$^3$ under a water pressure of 0.3 psig.

2. A gravity-flow water carafe comprising:

a raw water reservoir;

a treated water reservoir;

a filter reservoir containing a water filter;

the water filter comprising a cyst reduction filter element in the form of a cellular ceramic honeycomb body of a selectively plugged channel configuration, said body incorporating a first plurality of raw water inlet channels, a second plurality of treated water outlet channels, and an interconnecting network of porous channel walls separating the inlet channels from the outlet channels;

the cyst reduction filter element providing a primed water flux of at least about 0.3 ml/min/cm$^3$ of filter element volume at an inlet water pressure of 0.3 psig; and the filter reservoir being adapted to retain a quantity of raw water sufficient to fill the inlet channels and a quantity of treated water sufficient to fill the outlet channels of the honeycomb body when both the raw water reservoir and the treated water reservoir are empty.

* * * * *